Sept. 11, 1956  R. A. MANK  2,762,412
TIRE CHAINS
Filed March 3, 1953

INVENTOR.
Raymond A. Mank
BY William B. Jaspert
Attorney.

United States Patent Office 2,762,412
Patented Sept. 11, 1956

2,762,412

TIRE CHAINS

Raymond A. Mank, Pittsburgh, Pa.

Application March 3, 1953, Serial No. 340,046

1 Claim. (Cl. 152—213)

This invention relates to new and useful improvements in tire chains and it is among the objects thereof to provide a tire chain construction utilizing the conventional cross chains and a side chain to which one end of the cross chains are fastened, otherwise the tire chain construction is such that some of the cross chains are slidable members to facilitate assembling the chain on the wheel without the need for hoisting the wheel from the ground.

Figure 1:
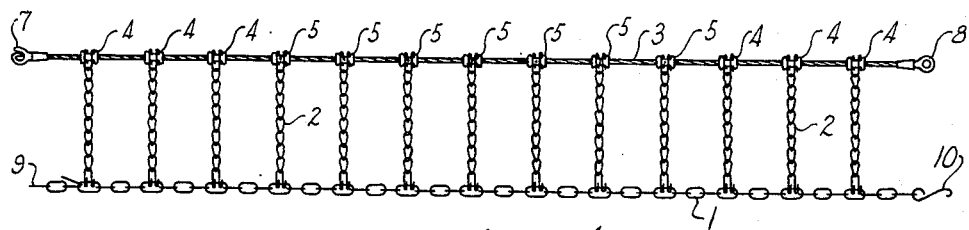
Figure 2:
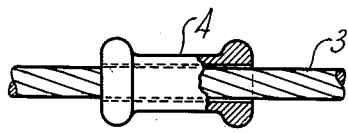
Figure 3:
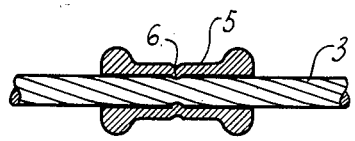
Figure 4:
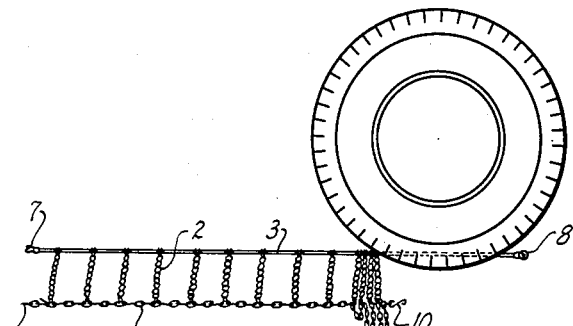
Figure 5:
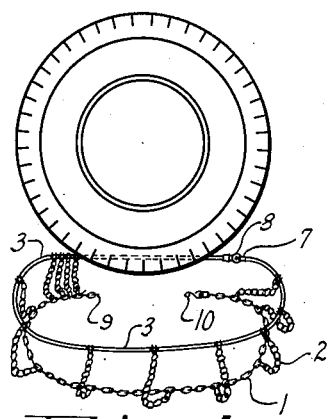
Figure 6:
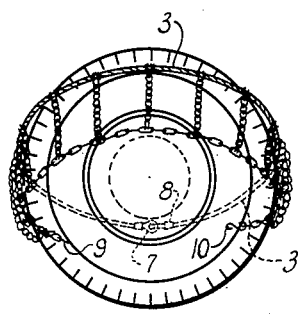
Figure 7:
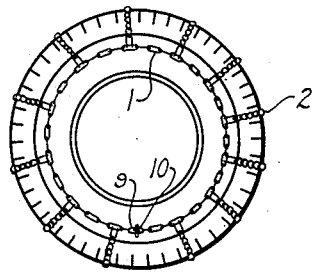

The invention will become more apparent from a consideration of the accompanying drawing constituting a part hereof in which like reference characters designate like parts and in which Fig. 1 is a top plan view of a tire chain embodying the principles of this invention, Fig. 2 is an enlarged detail of a portion of one of the side members and cross chain connectors of the chain shown in Fig. 1, Fig. 3 is a similar view with the connecting element shown in cross section, Fig. 4 is a side elevational view of a wheel and chain illustrating the manner of assembling the chain on the wheels, Fig. 5 a side elevational view of a wheel and chain illustrating a further step in the assembly of the chain to the wheel, Fig. 6 a similar view with the chain partially mounted on the wheel, and Fig. 7 a side elevational view of the assembled wheel and chain.

With reference to Figs. 1 to 3 of the drawing, the numeral 1 designates a conventional side chain and the numeral 2, cross chains with their ends fixed to the links of the side chain 1. The numeral 3 designates a cable or steel rod which is sufficiently flexible to curve, on which are mounted a plurality of ferrules 4 and 5, Figs. 2 and 3. The ends of the cross chains 2 are secured to the ferrules 4 and 5 and the ferrules 5 are secured to the cable or rod 3 by crimping the body portion as shown at 6, Fig. 3. In the structure shown in Fig. 1, the first three cross chains on each end of the tire chain are slidable on the cable or rod 3 and the seven intermediate cross chains have their ferrules 5 fixed against movement on the cable or rod 3, this being a prime feature of the invention. The fastening means for the end links of the side chains and cable may be of the conventional type although the cable member 3 may be provided with a simple hook and eye 7 and 8, respectively, since these ends are fastened before the chain is mounted on the wheel.

Figs. 4 to 7 inclusive illustrate the manner of assembling the tire chain to the wheel. This is accomplished by displacing the end ferrules 4 on cable or rod 3 to expose a free end of the member 3 which is slipped behind the wheel as it is standing on the ground in the manner shown in Fig. 4. The opposite end of the chain is then swung around and fastened in the manner shown in Fig. 5. The cable or rod 3 is then lifted over the top of the tire as shown in Fig. 6 until the cable portion 3 is behind the tire which brings the conventional link and fastening members 9 and 10 to the front of the wheel. The slidable ferrules 4 are then adjusted to properly space the cross chains on the wheel in the conventional manner and the members 9 and 10 are fastened as shown in Fig. 7 to complete the assembly of the chain on the wheel.

By means of the loosely mounted cross chain connectors on the rear side chain supporting member such as the cable or rod 3, enough of the length of the cable or rod can be freed of chains to conveniently pass it around the tire or wheel at the rear thereof which is not possible with a conventional tire chain employing side chains, and the cable or rod 3 is further a self-sustaining member which can be readily manipulated to be raised over the tire and to the rear thereof. After the chain has been assembled in the manner shown in Fig. 5, the cable or rod 3 is moved in a counter-clockwise direction as viewed in Fig. 5 for the purpose of bringing the fasteners 7 and 8 at approximately the center of the rear of the wheel which brings the side chain fasteners 9 and 10 to the center at the front of the wheel where it is readily accessible for fastening.

Although one embodiment of the invention has been herein illustrated and described, it will be evident to those skilled in the art that various modifications may be made in the details of construction without departing from the principles herein set forth.

I claim:

A tire chain assembly comprising a plurality of cross chains and one side chain with means for fastening its ends together, one end of each cross chain secured to said side chain, a flexible cable constituting a side fastening member for the other end of each of said cross chains, said flexible cable having means for fastening its ends together, each said other end of the cross chains being fastened to ferrules mounted on said flexible cable, the ferrules of the center cross chains being fastened by clamping the same on said cable in the same spaced relation as the spacing of said cross chains on the side chain, and a plurality of the ferrules adjacent each end of said cable being mounted for sliding movement on said cable to leave the ends of the cable free of chains for fastening around the base of a tire.

References Cited in the file of this patent

UNITED STATES PATENTS

| | | |
|---|---|---|
| 2,234,492 | Henry | Mar. 11, 1941 |
| 2,326,618 | Carlson et al. | Aug. 10, 1943 |